United States Patent Office 3,419,631
Patented Dec. 31, 1968

3,419,631
SUBSTITUTED ADAMANTANE COMPOUNDS
John J. van Venrooy, Wyncroft, Pa., assignor to Sun Oil
 Company, Philadelphia, Pa., a corporation of New
 Jersey
No Drawing. Filed Dec. 22, 1966, Ser. No. 603,760
17 Claims. (Cl. 260—668)

ABSTRACT OF THE DISCLOSURE

New hydrocarbo-substituted adamantane compounds are produced by a new process comprising reacting a halogen and/or hydroxyl bridgehead-substituted adamantane, or like-substituted alkyl adamantane, with a selected metal carbide to yield hydrocarbons possessing the adamantane nucleus with a substituent containing the benzyl nucleus attached to a bridgehead carbon atom.

Background of the invention

This invention pertains to adamantane compounds having a substituent containing the benzyl nucleus, and to a process for making the same.

The carbon nucleus of adamantane compounds contains ten carbon atoms arranged in a symmetrical, strainless manner such that there are three condensed six-membered rings and four bridgehead carbon atoms. The structure of adamantane itself is commonly depicted typographically as follows:

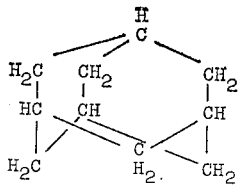

Numerous derivatives of adamantane have been prepared heretofore. However preparation of a derivative having a group containing the benzyl nucleus attached to the adamantane nucleus does not appear to have been heretofore achieved.

Summary of the invention

Illustrative of the compounds of the invention is 1-(1-mesityl)-3,5-dimethyladamantane which has the structure

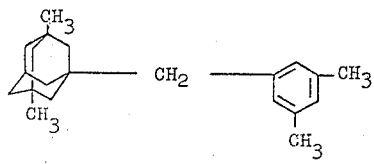

This and a wide variety of related adamantane compounds are made available in accordance with the invention as shown by the following equation.

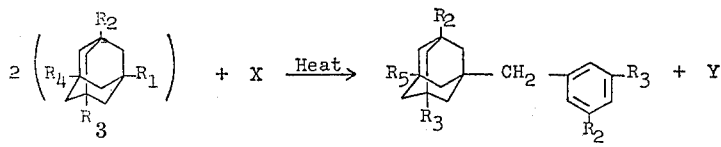

in which $R_1$ is halogen or hydroxyl; $R_2$ is hydrogen or alkyl; $R_3$ is hydrogen or alkyl; $R_4$ is halogen, hydroxyl, hydrogen or alkyl; and $R_5$ is hydrogen or alkyl; in which X is the carbide of magnesium, calcium, strontium or barium; and in which Y is a mixture of by-products and reaction residues including a metal chloride or hydroxide.

$R_1$ and $R_4$, considered individually, when halogen, can be chlorine, bromine, iodine or fluorine, preferably chlorine or bromine, and $R_2$, $R_3$, $R_4$ and $R_5$ considered individually, when alkyl, can be of 1–5 carbon atoms, e.g., methyl, ethyl, propyl, butyl or amyl, including isomers, and preferably methyl or ethyl.

When $R_4$ is halogen or hydroxyl, $R_5$ becomes hydrogen. Otherwise $R_4$ passes through the reaction without change, and becomes $R_5$.

As indicated in the above equation, the reaction is carried out at an elevated temperature which generally is above 325° C. Following well recognized guide rules in carrying out reactions by the application of heat, temperature conditions should be sufficiently high for the reaction to take place, preferably at a reasonable rate, and should not exceed a level at which disintegration of the desired product begins to set in significantly, and preferably should not exceed the level at which side reactions begin to predominate. Temperature conditions falling within the range of 375° C. and 500° C. generally are desirable, with temperatures of at least 400° C. preferred. The presence of a catalytic substance for speeding up the reaction, though unnecessary, is not precluded. The reaction is customarily carried out in a closed container.

The reaction can be performed in the absence or presence of a diluent which, if used, is preferably inert for practical purposes in the reaction zone. Suitable diluents are pentane or benzene.

DESCRIPTION OF THE PREFERRED EMBODIMENTS

The following examples are given by way of illustration.

Example I

To a clean 50 ml. stainless steel bomb was charged 2.5 parts by weight of powdered $CaC_2$ and 5 parts by weight of 1,3-dimethyl-5,7-dichloroadamantane. The bomb was equipped with a vent line. The vapor space of the bomb was swept out with helium after assembly by means of the open vent link which was then sealed with a rupture disc. The bomb was heated to 427° C. in a rocking autoclave over a period of two hours and fifteen minutes. This temperature was maintained for one hour after which the bomb was allowed to cool overnight to ambient temperature. The bomb was opened and the reaction product removed by rinsing out the contents with diethyl ether. The portion of the product that was soluble in diethyl ether was recovered as a heavy brown oil by evaporation of the solvent. The crude product was dissolved in heptane and purified by means of elution chromatography from a bed of acid-washed aluminum oxide. The color bodies were left behind on the aluminum oxide column. The eluted material was a heavy white oil which was identified as 1-(1-mesityl)-3,5-dimethyladamantane.

The structure was confirmed by the use of procedures or apparatus as follows: nuclear magnetic resonance, infrared spectroscopy and mass spectroscopy.

Example II

To a clean 50 ml. stainless steel bomb was charged 2.5 parts by weight by powdered $CaC_2$ and 3 parts by weight of 1,3-dimethyl-5,7-dichloroadamantane. Helium was used to provide an inert atmosphere as in the previous example.

The bomb was heated over a period of one hour and twenty-five minutes to 316° C. in a rocking autoclave. This temperature was maintained for one hour after which the bomb was allowed to cool overnight to ambient temperature. The bomb was opened and the reaction product removed by rinsing out the contents with diethyl ether. The portion of the product that was soluble in diethyl ether was recovered by evaporation of the solvent. An infrared spectra of this material showed it to be mostly unreacted 1,3-dimethyl-5,7-dichloroadamantane, indicating that the temperature was too low for substantial reaction of the particular materials here used.

Example III

To a clean 50 ml. stainless steel bomb was charged 0.4 part by weight of powdered $CaC_2$ and one part by weight of 1,3-dimethyl-5-bromoadamantane. Helium was used to provide an inert atmosphere as in the previous example. The bomb was heated over a period of two hours and fifteen minutes to 427° C. in a rocking autoclave. This temperature was maintained for one hour after which the bomb was allowed to cool overnight to ambient temperature. The bomb was opened and the reaction product removed by rinsing out the contents with diethyl ether. The portion of the product that was soluble in diethyl ether was recovered by evaporation of the solvent. The crude product was dissolved in heptane and purified by means of elution chromatography from a bed of acid-washed aluminum oxide. The color bodies were left behind on the aluminum oxide column. The eluted material was a heavy white oil which contained 1-(1-mesityl)-3,5-dimethyladamantane as shown by infrared spectroscopy and vapor phase chromatography.

Corresponding results are obtained by the substitution of other reactants as herein specified for those of the above examples. Also the use of other metal carbides as herein described in place of calcium carbide gives analogous results.

The new products produced in the practice of the process of the invention find a high degree of usefulness as intermediates in the production of synthetic detergents and wetting agents through sulfonation employing well known procedure for the purpose. The products of the invention upon sulfonation yield a series of sulfonated hydrocarbons particularly useful in the above-mentioned fields. The unique structure of the compounds of the invention, which structure contains both adamantyl and aryl moieties, makes these compounds particularly suitable for applications requiring a high degree of stability at elevated temperatures, such as experienced by internal combustion engine lubricating oils, heat transfer fluids, etc.

I claim:
1. As a new composition of matter, a compound having the formula

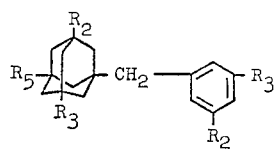

in which $R_2$ is hydrogen or alkyl having 1–5 carbon atoms, $R_3$ is hydrogen or alkyl having 1–5 carbon atoms, and $R_5$ is hydrogen or alkyl having 1–5 carbon atoms.

2. A compound of claim 1 in which $R_2$ and $R_3$ are alkyl groups.

3. 1-(1-mesityl)-3,5-dimethyladamantane.

4. A process which comprises contacting a carbide of magnesium, calcium, strontium or barium at a temperature above 325° C. with an adamantane compound having the formula

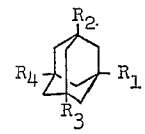

in which $R_1$ is halogen or hydroxyl; $R_2$ is hydrogen or alkyl having 1–5 carbon atoms; $R_3$ is hydrogen or alkyl having 1–5 carbon atoms; and $R_4$ is halogen, hydroxyl, hydrogen or alkyl having 1–5 carbon atoms; and recovering from the reaction mass a compound having the formula of a compound of claim 1.

5. The process of claim 4 in which $R_1$ and $R_4$ are each chlorine.

6. The process of claim 4 in which $R_1$ is bromine.

7. A process according to claim 4 wherein said carbide is calcium carbide.

8. A process according to claim 7 wherein both $R_2$ and $R_3$ are methyl and both $R_1$ and $R_4$ are halogen.

9. A process according to claim 8 wherein said adamantane compound is 1,3-dimethyl-5,7-dichloroadamantane and the compound recovered is 1-(1-mesityl)-3,5-dimethyladamantane.

10. A process according to claim 7 wherein both $R_2$ and $R_3$ are methyl, $R_1$ is halogen and $R_4$ is hydrogen.

11. A process according to claim 10 wherein $R_1$ is bromine and the compound recovered is 1-(1-mesityl)-3,5-dimethyladamantane.

12. A process according to claim 4 wherein the temperature is in the range of 375–500° C.

13. A process according to claim 7 wherein the temperature is in the range of 375–500° C.

14. A process according to claim 8 wherein the temperature is in the range of 375–500° C.

15. A process according to claim 10 wherein the temperature is in the range of 375–500° C.

16. The process according to claim 4 which comprises reacting calcium carbide at a temperature in the range of 375–500° C. with an adamantane compound having the formula specified and in which $R_1$ is halogen and $R_4$ is halogen, hydrogen or alkyl having 1–5 carbon atoms.

17. The process of claim 16 wherein $R_1$ is chlorine or bromine, and wherein $R_4$ is chlorine, bromine or hydrogen.

No references cited.

DELBERT E. GANTZ, *Primary Examiner.*

CURTIS R. DAVIS, *Assistant Examiner.*

U.S. Cl. X.R.

260—666